United States Patent
Deskevich et al.

(10) Patent No.: US 11,417,087 B2
(45) Date of Patent: Aug. 16, 2022

(54) IMAGE PROCESSING SYSTEM INCLUDING ITERATIVELY BIASED TRAINING MODEL PROBABILITY DISTRIBUTION FUNCTION AND RELATED METHODS

(71) Applicant: Harris Geospatial Solutions, Inc., Broomfield, CO (US)

(72) Inventors: Michael P. Deskevich, Boulder, CO (US); Robert A. Simon, Longmont, CO (US); Christopher R. Lees, Northglenn, CO (US)

(73) Assignee: HARRIS GEOSPATIAL SOLUTIONS, INC., Broomfield, CO (US)

( * ) Notice: Subject to any disclaimer, the term of this patent is extended or adjusted under 35 U.S.C. 154(b) by 636 days.

(21) Appl. No.: 16/514,901

(22) Filed: Jul. 17, 2019

(65) Prior Publication Data
US 2021/0019494 A1   Jan. 21, 2021

(51) Int. Cl.
| G06V 20/13 | (2022.01) |
| G06K 9/62 | (2022.01) |
| G06N 20/00 | (2019.01) |
| G06F 17/18 | (2006.01) |

(52) U.S. Cl.
CPC .............. *G06V 20/13* (2022.01); *G06F 17/18* (2013.01); *G06K 9/6256* (2013.01); *G06K 9/6267* (2013.01); *G06N 20/00* (2019.01)

(58) Field of Classification Search
CPC ........ G06V 10/10; G06V 10/20; G06V 10/72; G06V 10/778; G06V 10/7796; G06V 20/10; G06V 20/13; G06V 20/17; G06V 20/176; G06V 20/182; G06V 20/188; G06V 20/194; G06K 9/00; G06K 9/6256; G06K 9/6262; G06K 9/6265; G06K 9/6298; G06T 2207/20081; G06T 2207/20084; G06N 20/00
See application file for complete search history.

(56) References Cited

U.S. PATENT DOCUMENTS

| 9,536,206 B2 | 1/2017 | Harik |
| 9,858,529 B2 | 1/2018 | Adams et al. |
| 9,864,953 B2 | 1/2018 | Adams et al. |
| 2015/0109474 A1* | 4/2015 | Saruta .................... G06V 20/10 348/222.1 |
| 2016/0110657 A1 | 4/2016 | Gibiansky et al. |
| 2016/0132787 A1 | 5/2016 | Drevo et al. |

(Continued)

OTHER PUBLICATIONS

Wikipedia; "Inverse transform sampling;" last updated Jun. 26, 2019; pp. 1-6; website: https://en.wikipedia.org/wiki/Inverse_transform_sampling.

*Primary Examiner* — Andrew W Johns
(74) *Attorney, Agent, or Firm* — Allen, Dyer, Doppelt + Gilchrist, P.A.

(57) ABSTRACT

An image processing system may include a processor and an associated memory configured to store training data that includes training geospatial images. Each training geospatial image may include pixels. The processor may be configured to operate a training model to identify a given feature from each of the training geospatial images, and to iteratively generate a probability distribution function based upon a number of pixels corresponding to the given feature and also based upon a bias factor being reduced with each iteration.

24 Claims, 13 Drawing Sheets

(56) References Cited

U.S. PATENT DOCUMENTS

| | | |
|---|---|---|
| 2017/0032245 A1 | 2/2017 | Osband et al. |
| 2017/0061326 A1 | 3/2017 | Talathi et al. |
| 2017/0132528 A1 | 5/2017 | Aslan et al. |
| 2017/0147921 A1 | 5/2017 | Kasahara |
| 2017/0364796 A1 | 12/2017 | Wiebe et al. |
| 2018/0068216 A1 | 3/2018 | Sheng et al. |
| 2018/0082212 A1 | 3/2018 | Faivishevsky et al. |
| 2018/0101766 A1 | 4/2018 | He et al. |
| 2018/0122082 A1 | 5/2018 | Mukherjee et al. |
| 2018/0129930 A1 | 5/2018 | Shin et al. |
| 2018/0150728 A1 | 5/2018 | Vahdat |
| 2018/0240031 A1 | 8/2018 | Huszar et al. |
| 2018/0247159 A1 | 8/2018 | Gu |

\* cited by examiner

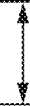

```
                                    ┌─ 21
┌─────────────────────────────────────────────────────────────────────┐
│                             PROCESSOR                               │
│ • STORE TRAINING DATA INCLUDING TRAINING GEOSPATIAL IMAGES, EACH INCLUDING PIXELS │
│                                                                     │
│ • OPERATE A TRAINING MODEL (e.g.; A MASK-BASED TRAINING MODEL) TO IDENTIFY A GIVEN │
│   FEATURE FROM EACH OF THE TRAINING GEOSPATIAL IMAGES               │
│                                                                     │
│ • OPERATE THE TRAINING MODEL TO ITERATIVELY GENERATE A PROBABILITY DISTRIBUTION │
│   FUNCTION BASED UPON A NUMBER OF PIXELS CORRESPONDING TO THE GIVEN FEATURE │
│   (e.g. BASED UPON AN ENTROPY, SUCH AS A SHANNON ENTROPY, OF EACH TRAINING │
│   GEOSPATIAL IMAGE) AND ALSO BASED UPON A BIAS FACTOR BEING REDUCED WITH EACH │
│   ITERATION (e.g., USE AN INITIAL BIAS FACTOR SO THAT THE TRAINING MODEL IDENTIFIES A │
│   PIXEL CORRESPONDING TO THE GIVEN FEATURE FOR EACH PREDETERMINED NUMBER OF │
│   PIXELS THAT DO NOT CORRESPOND TO THE GIVEN FEATURE; THE BIAS FACTOR REDUCED TO │
│   A TERMINAL ZERO OR NON-ZERO BIAS FACTOR)                          │
│                                                                     │
│ • OPERATE THE TRAINING MODEL TO IDENTIFY THE GIVEN FEATURE FROM A PLURALITY OF │
│   GEOSPATIAL IMAGES                                                 │
└─────────────────────────────────────────────────────────────────────┘

┌─────────────────────────────────────────────────────────────────────┐
│                              MEMORY                                 │
│ • TRAINING DATA INCLUDING TRAINING GEOSPATIAL IMAGES                │
└─────────────────────────────────────────────────────────────────────┘
                                                           └─ 22
```

PROCESSOR ─ 21

- STORE TRAINING DATA INCLUDING TRAINING GEOSPATIAL IMAGES (e.g. INCLUDING PIXELS)

- OPERATE A TRAINING MODEL (e.g., A MASK-BASED TRAINING MODEL) TO IDENTIFY A GIVEN FEATURE FROM EACH OF THE TRAINING GEOSPATIAL IMAGES

- OPERATE THE TRAINING MODEL TO ITERATIVELY APPLY A BIAS FACTOR (e.g., AN EXPONENTIAL FUNCTION BASED UPON THE PLURALITY OF PIXELS, SUMMATION OF THE EXPONENTIAL FUNCTION, SUMMATION OF THE EXPONENTIAL FUNCTION MULTIPLIED BY THE LOSS FUNCTION) TO A LOSS FUNCTION BASED UPON THE NUMBER OF INCORRECTLY IDENTIFIED PIXELS FOR THE GIVEN FEATURE (e.g., FOR MASKED ONES OF THE PIXELS), THE BIAS FACTOR BEING REDUCED WITH EACH ITERATION

- OPERATE THE TRAINING MODEL TO IDENTIFY THE GIVEN FEATURE FROM A PLURALITY OF GEOSPATIAL IMAGES

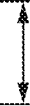

MEMORY
- TRAINING DATA INCLUDING TRAINING GEOSPATIAL IMAGES

IMAGE PROCESSING SYSTEM INCLUDING ITERATIVELY BIASED TRAINING MODEL PROBABILITY DISTRIBUTION FUNCTION AND RELATED METHODS

TECHNICAL FIELD

The present invention relates to the field of image processing, and more particularly, to processing geospatial images and related methods.

BACKGROUND

Deep learning is a type of machine learning where models with a relatively large number of parameters are optimally configured to solve a problem. To train a deep learning model, features, for example, in images, may be spatially and spectrally identified. Traditionally features are spatially and spectrally identified by providing a model with a relatively large corpus of known example images for learning the features to extrapolate images not seen before by the model. Known example images may be labeled as such manually.

Oftentimes, the amount of known example images may be considered sparse. A common technique for learning using a sparse amount of example images is to increase the amount of known examples by "augmentation." That is, the examples may be transformed in a way to create synthetic data for the model to learn. Usually, this is done so that the model can generalize to be rotation-, translation-, and scale-invariant. Augmentation typically only changes the relative appearance of the examples that the model is seeing, and typically does not bias the model.

U.S. Patent Application Publication No. 2016/0110657 to Gibiansky et al. is directed to a configurable machine learning method selection and parameter optimization system. More particularly, Gibiansky et al. discloses determining a first candidate machine learning method, and tuning one or more parameters of the first candidate machine learning method. A determination is made as to whether the first candidate machine learning method and a first parameter configuration for the first candidate machine learning method are the best based on a measure of fitness subsequent to satisfaction of a stop condition. The first candidate machine learning method and the first parameter configuration for the first candidate machine learning method are output.

U.S. Patent Application Publication No. 2018/0247159 to Gu is directed to a method of constructing a neural network model for super deep confrontation learning. A machine learning model may be constructed that enables deep competitive learning between data based on the exact distance. A precise distance scale is submitted by unifying Euclidean space and probability space. A measure of the probability measure of fuzzy event based on this distance is submitted. Alternatively, a new neural network is constructed that can transmit information of the maximum probability. Furthermore, super deep competition learning is performed between data having very small ambiguous fuzzy information and minute unstable probability information.

SUMMARY

An image processing system may include a processor and an associated memory configured to store training data including a plurality of training geospatial images. Each training geospatial image may include a plurality of pixels. The processor may be configured to operate a training model to identify a given feature from each of the plurality of training geospatial images, and to iteratively generate a probability distribution function based upon a number of pixels corresponding to the given feature and also based upon a bias factor being reduced with each iteration.

The training model may include a mask-based training model, for example. The processor may be configured to reduce the bias factor to a terminal non-zero bias factor. The processor may be configured to reduce the bias factor to a terminal zero bias factor, for example.

The processor may be configured to use an initial bias factor so that the training model identifies a pixel corresponding to the given feature for each predetermined number of pixels that do not correspond to the given feature, for example. The processor may be configured to generate the probability distribution function based upon an entropy of each training geospatial image.

The processor may be configured to generate the probability distribution function based upon a Shannon entropy of each training geospatial image. The processor may be configured to operate the training model to identify the given feature from a plurality of geospatial images, for example.

A method aspect is directed to a method of processing an image. The method may include using a processor and an associated memory to store training data including a plurality of training geospatial images. Each training geospatial image may include a plurality of pixels. The method may also include using the processor to operate a training model to identify a given feature from each of the plurality of training geospatial images, and to iteratively generate a probability distribution function based upon a number of pixels corresponding to the given feature and also based upon a bias factor being reduced with each iteration.

A computer readable medium aspect is directed to a non-transitory computer readable medium for processing an image. The non-transitory computer readable medium includes computer executable instructions that when executed by a processor cause the processor to perform operations. The operations may include storing training data including a plurality of training geospatial images. Each training geospatial image may include a plurality of pixels. The operations may also include operating a training model to identify a given feature from each of the plurality of training geospatial images, and to iteratively generate a probability distribution function based upon a number of pixels corresponding to the given feature and also based upon a bias factor being reduced with each iteration.

BRIEF DESCRIPTION OF THE DRAWINGS

FIG. 2 is a schematic block diagram of the image processing system of FIG. 1.

FIG. 16 is a schematic block diagram of the image processing system of FIG. 15.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
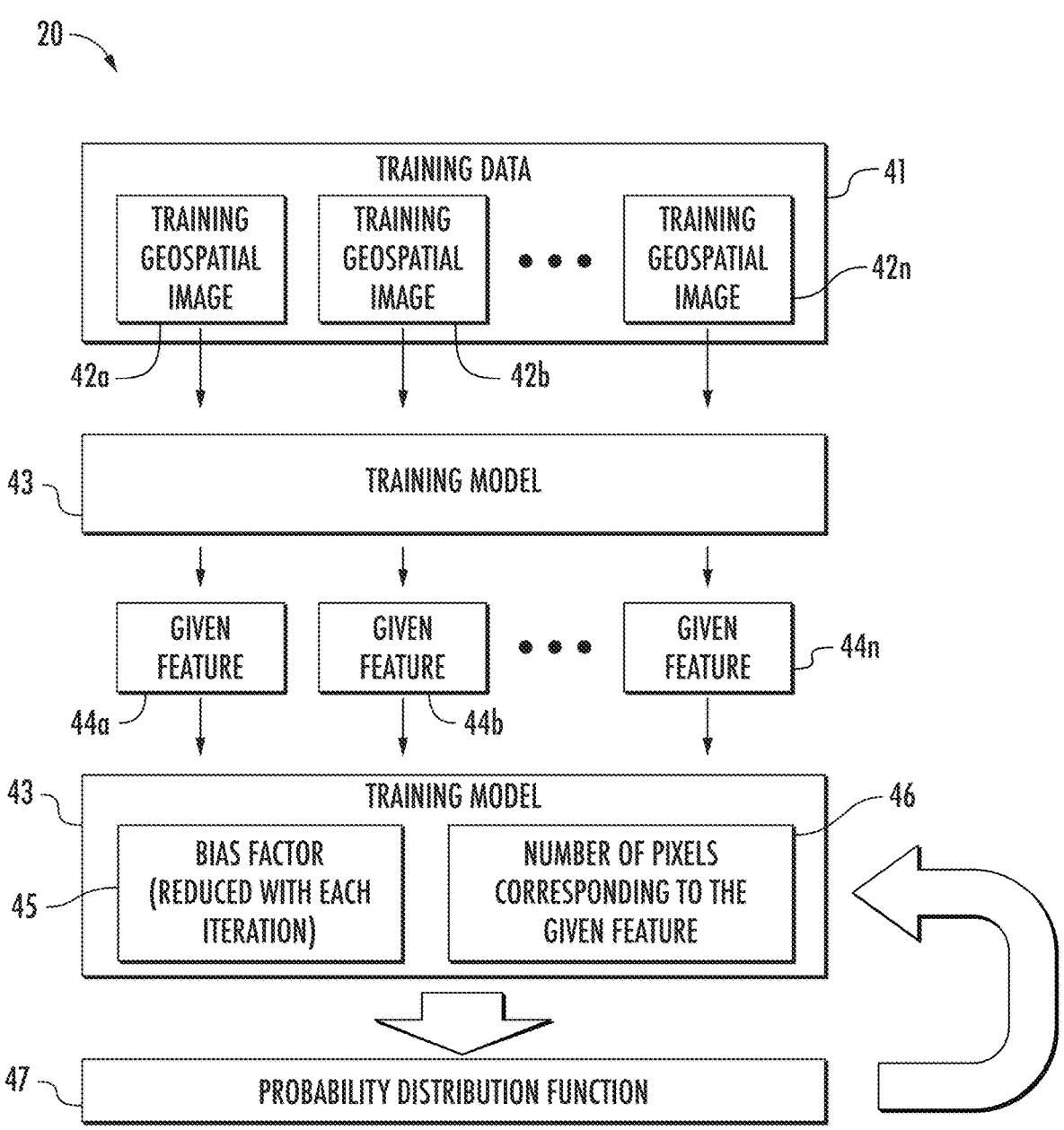
FIG. 1 is a schematic diagram of an image processing system according to an embodiment.
Figure 3:
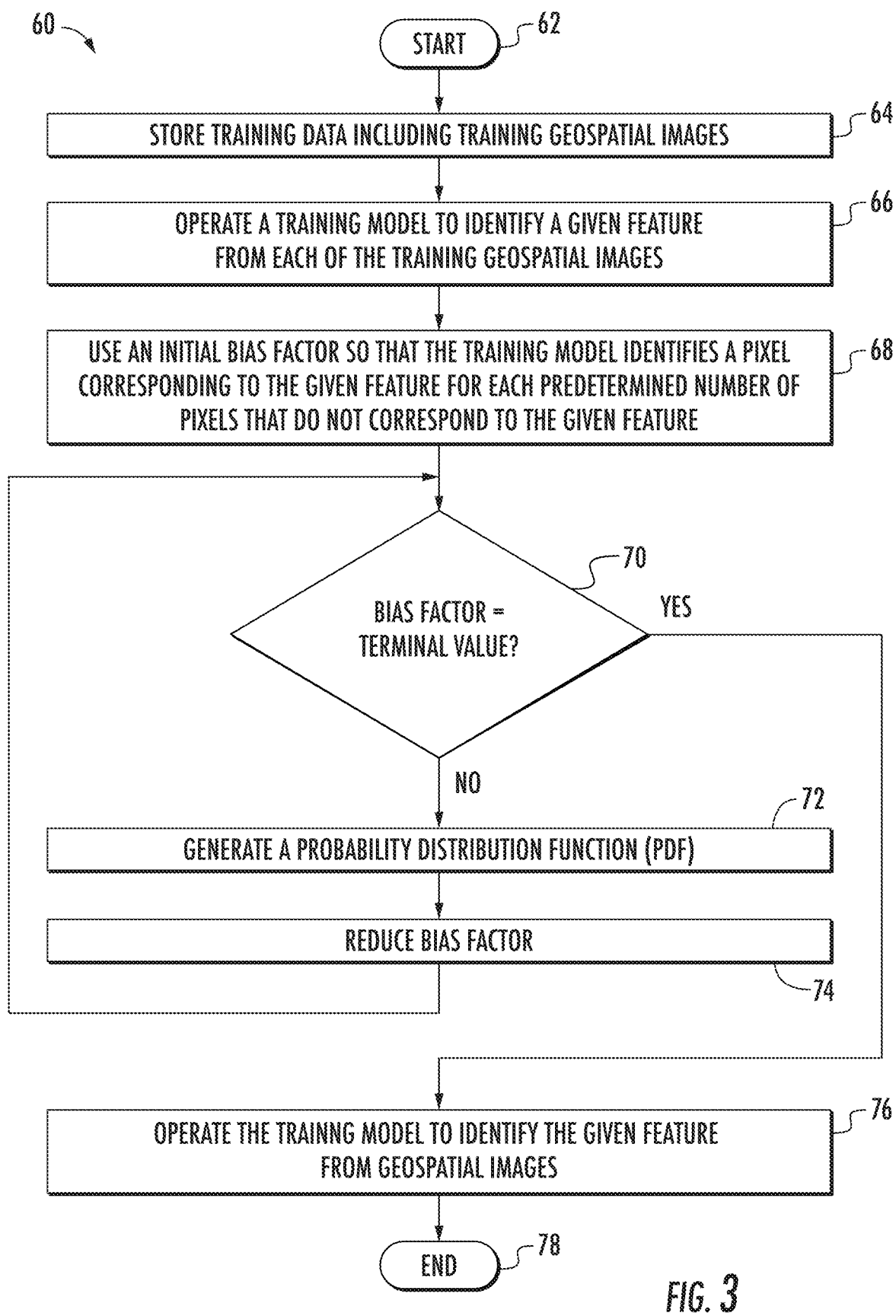
FIG. 3 is a flow diagram illustrating operation of the image processing system of FIG. 1.

Referring initially to FIGS. 1 and 2 and the flowchart 60 in FIG. 3, operation of and image processing system 20 will be described. The image processing system 20 includes a processor 21 and an associated memory 22. Beginning at Block 62, the processor 21 stores training data 41 (Block 64). The training data 41 includes training geospatial images 42a-42n. For example, the training geospatial images 42a-42n may each be images (e.g., satellite) of a roadway, neighborhood, or selected area of land or ocean. Of course, the training geospatial images 42a-42n may include other and/or additional types of geospatial images. Each training geospatial image 42a-42n includes pixels.

At Block 66, the processor 21 operates a training model 43 to identify a given feature 44a-44n from the each of the training geospatial images 42a-42n. The training model 43 may be considered a deep learning model, and more particularly, a mask-based model.

A mask-based model is one that classifies every pixel of an image and creates a "mask" of pixels that represent the regions of classified features. A mask-based model is different than, for example, a "patch-based" classification where an example image is presented to the model, and the model makes a "yes" or "no" decision with respect to the existence or absence of a given feature somewhere in the patch. For example, mask-based training model or classification may generate a building footprint, whereas patch-based training model or classification may simply decide if a building is in the region (or patch) that is was presented.

As will be appreciated by those skilled in the art, deep learning models are trained or shown exemplary data before the model is used to classify new data. A typical workflow may include manual (i.e., a human) labeling of regions of interest to highlight the features to identify. Features may be two-dimensional (e.g., the outlines or footprints of buildings and parking lots), one-dimensional (e.g., roads, paths, and railroad tracks), or zero-dimensional (e.g., locations of trees or stop signs).

Once the regions have been labeled, as noted above, a mask for each feature is created, for example, at the same resolution as an example image. A value of 0 in the mask is a "negative", or an example of not the feature, and a value of 1 in the mask is a "positive" or an example of the feature. In the case of "multi-class" models, the values 1 . . . n represent n different classes of interest.

Figure 4:
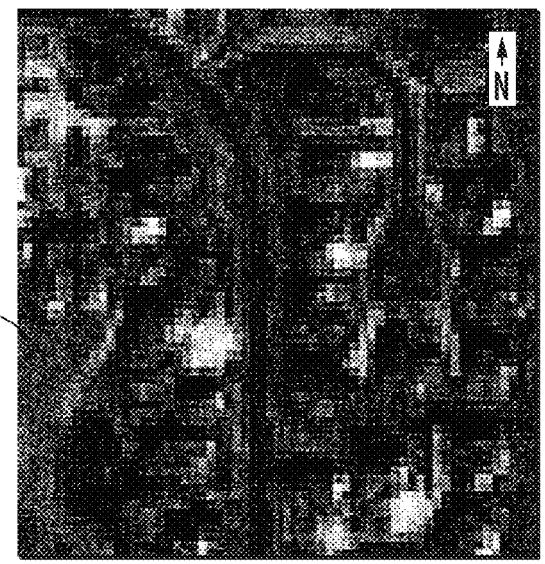
FIG. 4 is a satellite image of a neighborhood for use with an image processing system according to an embodiment.
Figure 5:
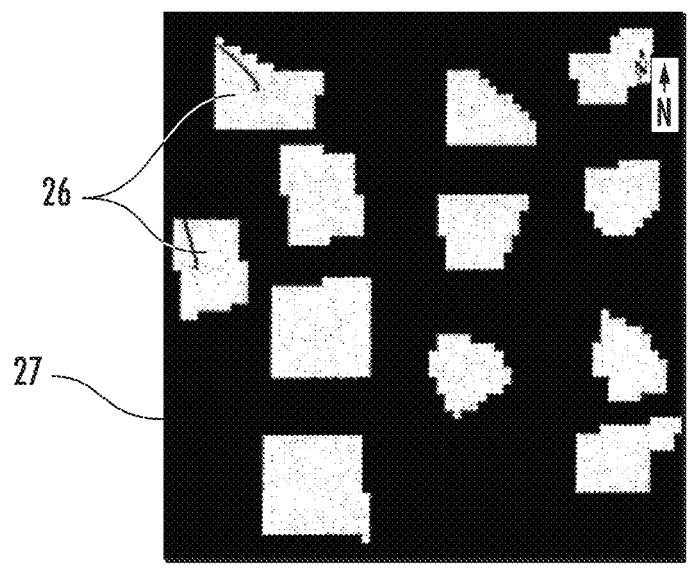
FIG. 5 is a masked version of the image of FIG. 4 highlighting locations of the buildings for use with an image processing system according to an embodiment.

FIG. 4 is an exemplary satellite image 25 of a neighborhood. FIG. 5, illustrates the mask 26 which highlights the locations of the buildings in the neighborhood image in FIG. 4. The open areas 27 correspond to pixels that are part of a building, while the dark region corresponds to pixels that are not part of the building. The goal is to train a deep learning model to generate the mask (i.e., the illustrated open areas) on new data to indicate where buildings are located. Of course, while buildings are illustratively a given feature of an exemplary geospatial image, another given feature or features may be identified or highlighted by the mask.

Training a model generally includes repeated exposures of the example images with the mask to the deep learning model. Typically, a region of the images is chosen to be as big as possible with respect to processing power (e.g., corresponding to the processing power of the processor 21 and associated memory 22). It is thus desirable for the model to learn to generate the same mask, e.g. as shown in the example above. At first, the model "guesses" whether a pixel is part the given feature and generates what may essentially be considered a random mask. Through what may be considered a goodness-of-fit function, which may be commonly called the associated loss function, the model is informed when and where its random guess was incorrect. Accordingly, based upon the loss function, internal parameters of the model are adjusted to make it more accurate.

Over time, the model learns to translate the spectral and spatial information in images into a mask that highlights the features that were presented to the model during training. Improved results are typically achieved when the relative population of positive to negative examples (0 and 1 mask pixels) may not be much more than 1:100, for example. If one of the examples is dramatically more prevalent than the other, the model may degenerate to make a constant value mask of the most prevalent feature class.

Accordingly, it may be desirable to bias a training model to learn what may be considered sparse features that may normally be un-learnable because conventional techniques would likely degenerate to only learning "negative".

Returning again to the flowchart 60, to bias the training model, the processor 21 operates the training model 43 to iteratively generate a probability distribution function (PDF) 47 based upon a number of pixels corresponding to the given feature 46 and also based upon a bias factor 45 that is reduced with each iteration. More particularly, the processor 21 may use an initial bias factor so that the training model 43 identifies a pixel corresponding to the given feature for each predetermined number of pixels that do not correspond to the given feature (Block 68). The processor 21 determines, with each iteration, at Block 70 whether the bias factor 45 is equal to a terminal bias value, for example, a terminal zero bias factor. In some embodiments, the processor 21 may reduce the bias factor 45 to a terminal non-zero bias factor. If the bias factor 45 has reached a terminal bias value, the training model 43 may be considered trained and operations move to Block 76. At Block 72, the processor 21 generates the PDF 47, for example, based upon an entropy of each training geospatial image, and more particularly, based upon a Shannon entropy of each training geospatial image. The bias factor 45 is reduced at Block 74. Operations return to Block 70.

The processor 21 operates the training model 43 to identify the given feature 44a-44n from geospatial images (Block 76). In other words, upon completion of the training model 43, the model is used to identify the given feature 44a-44n in images that were not used for training. Operations end at Block 78.

Further details of biasing the training model 43 will now be described. As noted above, a first step in training a deep learning model is to train the model with examples of positive and negative regions in situ. Typically this is done by cycling through all of the examples in the training corpus an integral number of times (each iteration is generally called the "epoch"). The reasoning is that all examples are generally created equal and by showing them all to the model, the model learns the underlying distribution.

In the case of sparse positives, showing the model all of the examples equally causes the model to overgeneralize and learn an all-negative mask. Thus, it is desirable to bias the model to see examples that include more positives more often. The biasing approach described herein is based on a statistical technique called inverse transform sampling, where the examples shown to the model are shown based upon, e.g., in proportion to, their contribution to a PDF.

A PDF of all of the examples in the training corpus is created based on the number of positive pixels that exist in each training example. Since all examples are the same dimension, the number of positive pixels is proportional to the area of the features to be identified. More specifically, the $i^{th}$ example contributes $p_i^b$ to the PDF where $p_i$ is the number of positive pixels in the mask and b is a tunable parameter or bias factor that decays towards 0 while training. Initially, b is chosen so that, e.g., on average, the model sees approximately a 1:100 ratio of positive to negative pixels (as opposed to sparse data which may be 1:10,000 or 1:100,000). As the model learns to distinguish between positive and negative pixels, b decays towards 0 (which creates a flat, or uniform PDF), so that the model correctly learns the distribution of positives and negative pixels.

Figure 6:
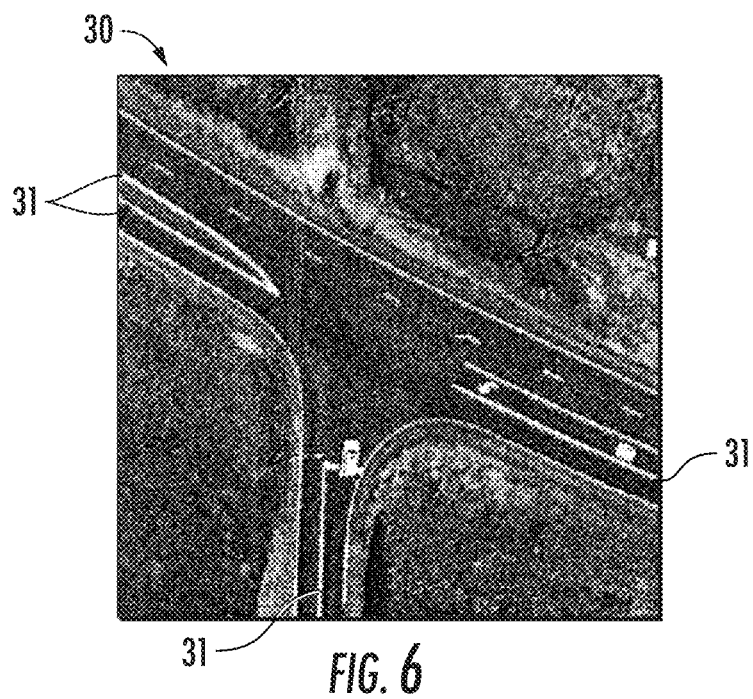
FIG. 6 is an exemplary training geospatial image with a relatively small amount of positive pixels for use with an image processing system according to an embodiment.
Figure 7:
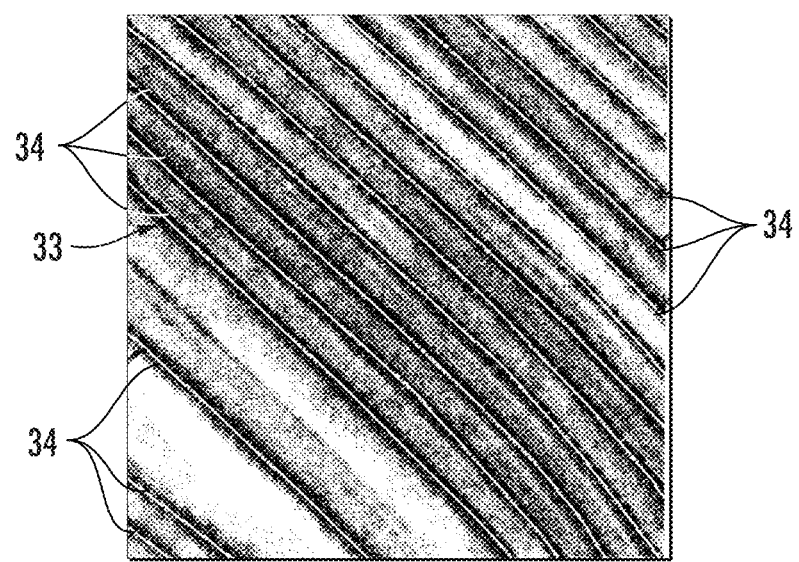
FIG. 7 is an exemplary training geospatial image with a relatively large amount of positive pixels for use with an image processing system according to an embodiment.

The image 30 in FIG. 6 is a training example with a relatively small amount of positive pixels 31. The positive pixels 31 are illustratively the manually labelled lines on a road. The rest of the pixels in the image 30 are considered negative pixels. The image 33 in FIG. 7 is a training example with a relatively large amount of positive pixels 34. The positive pixels 34 correspond to the rows of crops in a field.

In the case of multi-class classification, counting simply the "positives" or "not-background" may not be sufficient enough to create a relatively good metric for sample selection. In this case, the Shannon Entropy, H, of each patch as the base metric may be used for the PDF. In this case, $H_i$, replaces $p_i$: the $i^{th}$ example contributes $H_i^b$ to the PDF where $H_i$ is the Shannon Entropy of the $i^{th}$ patch.

If biased example selection, for example, as described herein, is not used, all the examples are chosen with equal probability and may result in relatively poor learning of sparse features. Biased example selection operates so that when b=0, degeneration into unbiased behavior occurs, which means that a large b may be used as a starting point when trying to focus the model relatively early in the training process and b decays toward 0 to generate what is considered a statistically valid model at the end of training. In practice, the user chooses a schedule for b that updates at the end of every epoch such that b=0 at the last epoch of training.

A method aspect is directed to a method of processing an image. The method includes using a processor 21 and an associated memory 22 to store training data 41 including a plurality of training geospatial images 42a-42n. Each training geospatial image 42a-42n may include a plurality of pixels. The method also includes using the processor 21 to operate a training model 42 to identify a given feature 44a-44n from each of the plurality of training geospatial images 42a-42n, and to iteratively generate a probability distribution function 47 based upon a number of pixels corresponding to the given feature and also based upon a bias factor 45 being reduced with each iteration.

A computer readable medium aspect is directed to a non-transitory computer readable medium for processing an image. The non-transitory computer readable medium includes computer executable instructions that when executed by a processor 21 cause the processor to perform operations. The operations include storing training data 41 including a plurality of training geospatial images 42a-42n. Each training geospatial image 42a-42n includes a plurality of pixels. The operations also include operating a training model 43 to identify a given feature 44a-44n from each of the plurality of training geospatial images 42a-42n, and to iteratively generate a probability distribution function 47 based upon a number of pixels corresponding to the given feature 46 and also based upon a bias factor 45 being reduced with each iteration.

Figure 8:
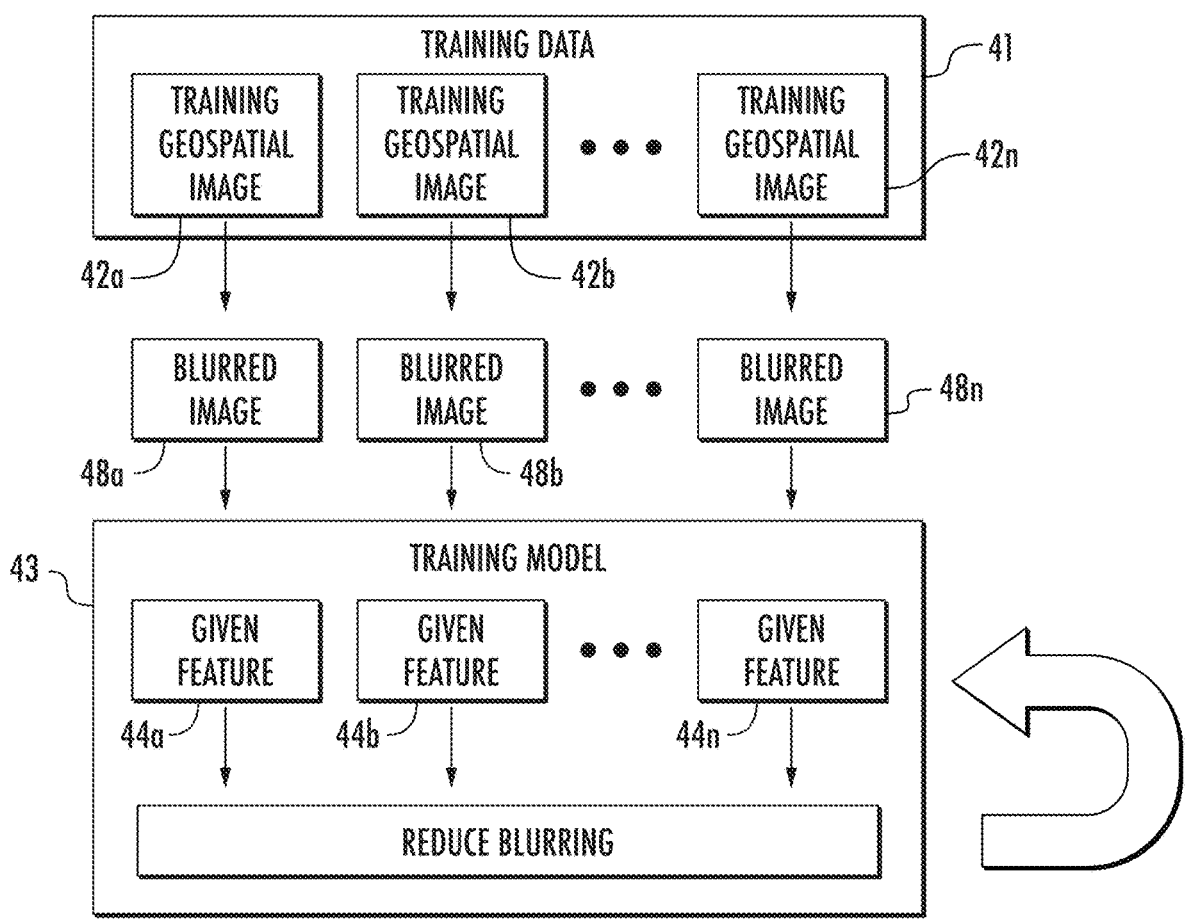
FIG. 8 is a schematic diagram of an image processing system according to an embodiment.
Figure 9:
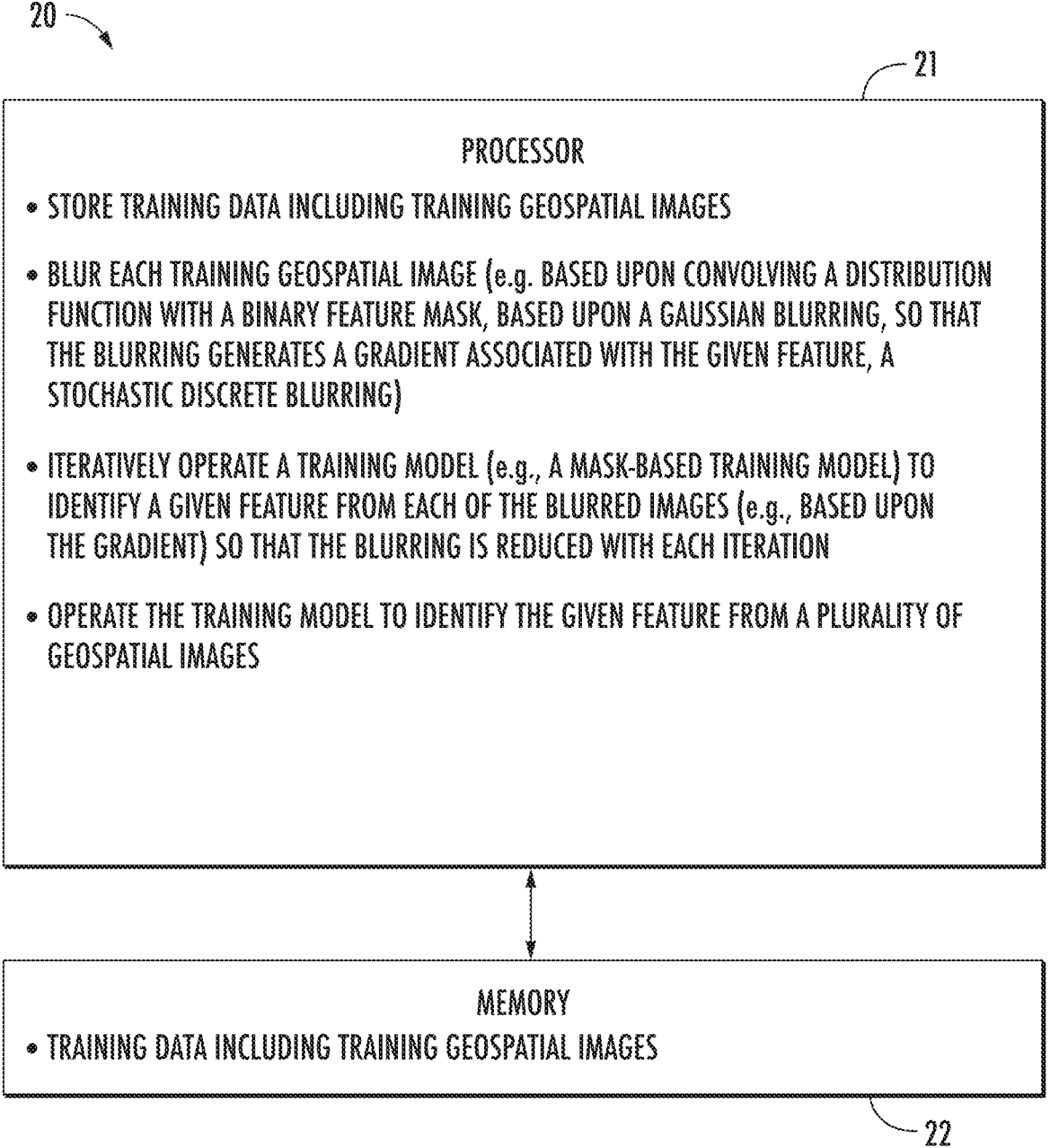
FIG. 9 is a schematic block diagram of the image processing system of FIG. 8.
Figure 10:
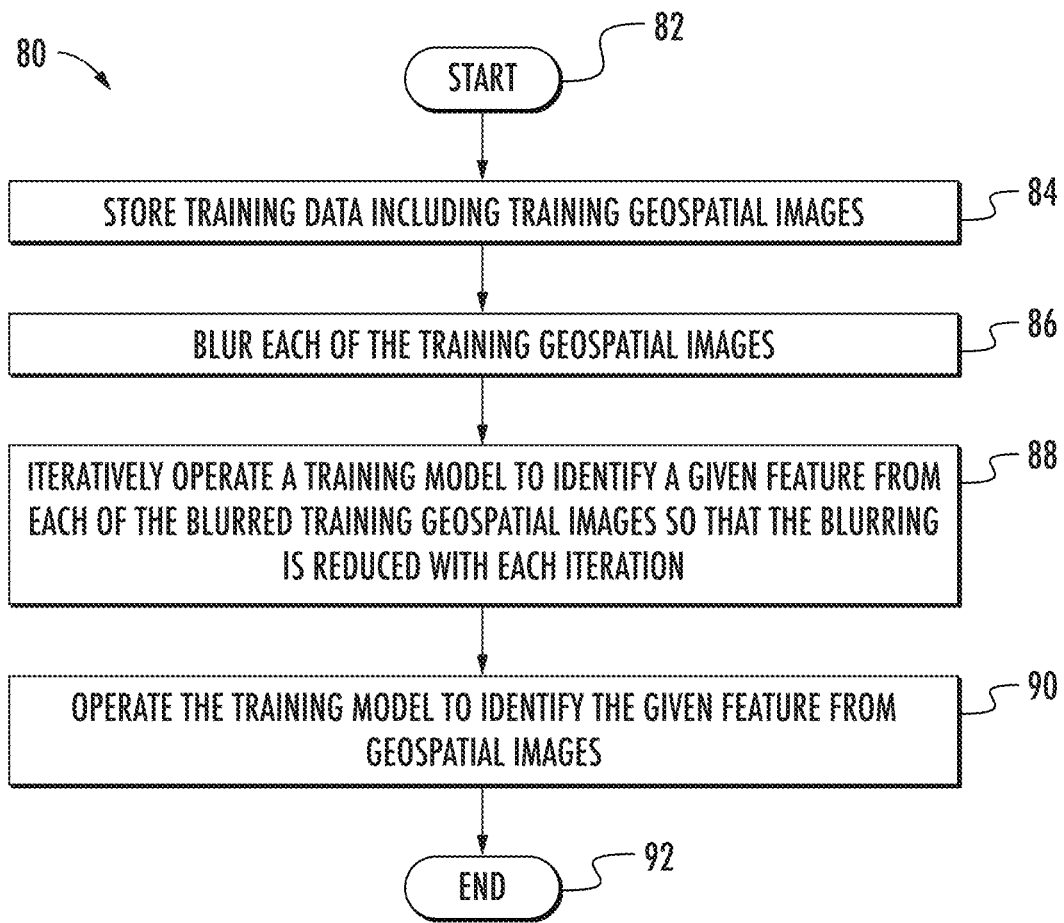
FIG. 10 is a flow diagram illustrating operation of the image processing system of FIG. 8.

Referring now to FIGS. 8 and 9 and the flowchart 80 in FIG. 10, beginning at Block 82, further operations of the image processing system 20 will now be described with respect to blurring and fuzzification. At Block 84, the processor 21 stores training data 41 that includes training geospatial images 42a-42n. At Block 86, the processor 21 blurs each of the training geospatial images 42a-42n. The processor 21 may blur each of the training geospatial images 42a-42n based upon convolving a distribution function with a binary feature mask. The processor 21 may blur each of the training geospatial images 42a-42n based upon a Gaussian blurring. Alternatively or additionally, the processor 21 may blur each of the training geospatial images 42a-42n based upon a stochastic discrete blurring (i.e., fuzzification). In some embodiments, the processor 21 may blur each of the geospatial training images 42a-42n so that the blurring generates a gradient associated with the given feature 44a-44n.

The processor 21 iteratively operates a training model 43, for example, a mask-based training model, to identify a given feature 44a-44n from each of the blurred training geospatial images 48a-48n so that the blurring is reduced with each iteration (Block 88). The processor 21 may identify, where a gradient is generated, the given feature 44a-44n based upon the gradient. The processor 21 operates the training model 43 to identify the given feature 44a-44n from geospatial images (Block 90). In other words, upon completion of the training model 43, the model is used to identify the given feature 44a-44n in images that were not used for training. Operations end at Block 92.

Further details of blurring and fuzzification will now be described. While the previously described transform may present the most relevant examples to the training model more often, it may be desirable to provide the training model with a continuous (or pseudo-continuous) attractor to guide it toward learning the size and shape of the feature masks.

The blurring and fuzzification techniques described herein may advantageously increase learning speeds of a deep learning model. As will be appreciated by those skilled in the art, these techniques account for i) the uncertainty of pixel state at the boundary of a feature; ii) the finite size of real-world features; and iii) the desire to smoothly guide the internal parameters of a model to converge.

When creating a pixel mask to classify pixels in a digital image, the pixels at the edge of a feature are generally not "pure". That is, the continuous nature of the world cannot be captured exactly by discrete pixels and pixels at the edge may be both in and out of the feature. For example, with respect to a building footprint, interior pixels are entirely inside the building, but the edge of the building may not align perfectly with the edge of the pixels and may represent a mixture of inside and outside the building.

A point or linear feature may be represented by a zero-area geometric construct. When creating a mask out of the given feature, a single pixel (e.g., for a point) or a single pixel wide (e.g., for a line) mask is created. However, real world features have a fixed size. A road, for example, designated as a line, which has zero (or one pixel) width, in real life has a real finite width that is to be learning by the model.

Deep learning models may be considered mathematical constructs that create a mapping from spectral and spatial features to a relatively simple discrete classification. However, a training model that receives feedback as to whether it is approaching the correct answer more smoothly rather than abruptly transitioning from true to false at the edge of a masked pixel may be considered a more robust with respect to learning. Indeed, a smooth continuous gradient is generally more stable than a discrete one.

The blurring and fuzzification approaches described herein address the above-noted deep learning drawbacks. Blurring may be considered the act of convolving a distribution function with the binary feature mask. A Gaussian blur may be chosen as a relatively fast and common operation, but those skilled in the art will appreciate that any function that smoothly transforms a discrete binary mask may work. This accounts for all three drawbacks with mask-based learning listed above: i) pixels at the edge of the mask get a smaller value than the ones in the center—this numerically represents the loss of pixel purity at the edges; ii) roads, for example, and point features are blurred and increase in size to fully represent the real-world object; and iii) by following a gradient decent, a training model that is near a masked pixel smoothly adjusts parameters and learns rather than having no gradient to attract it to the right answer.

Figure 11:
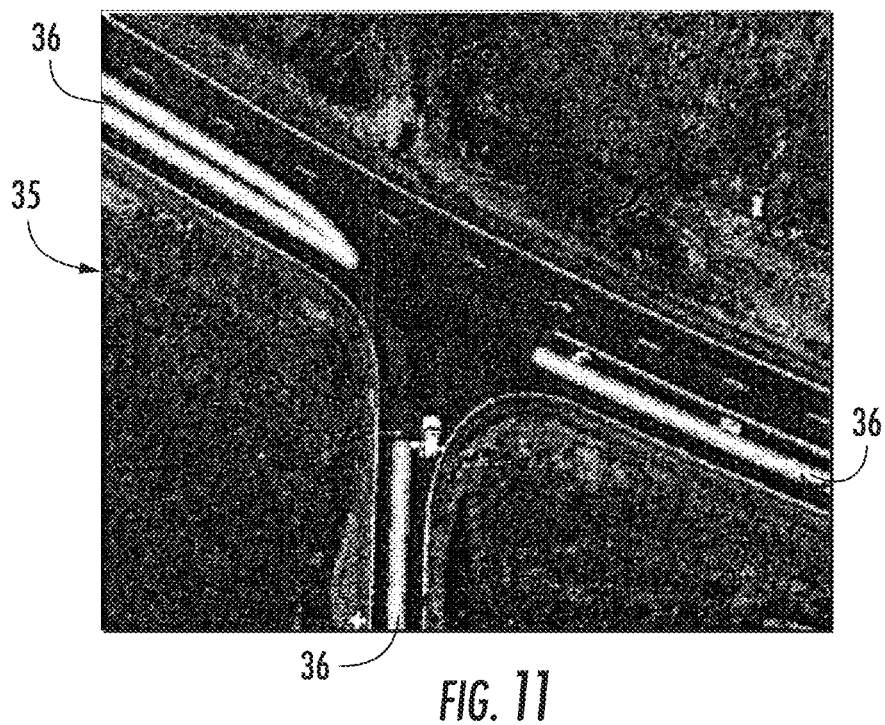
FIG. 11 is an exemplary image illustrating a relatively small blurring in accordance with the image processing system of FIG. 8.
Figure 12:
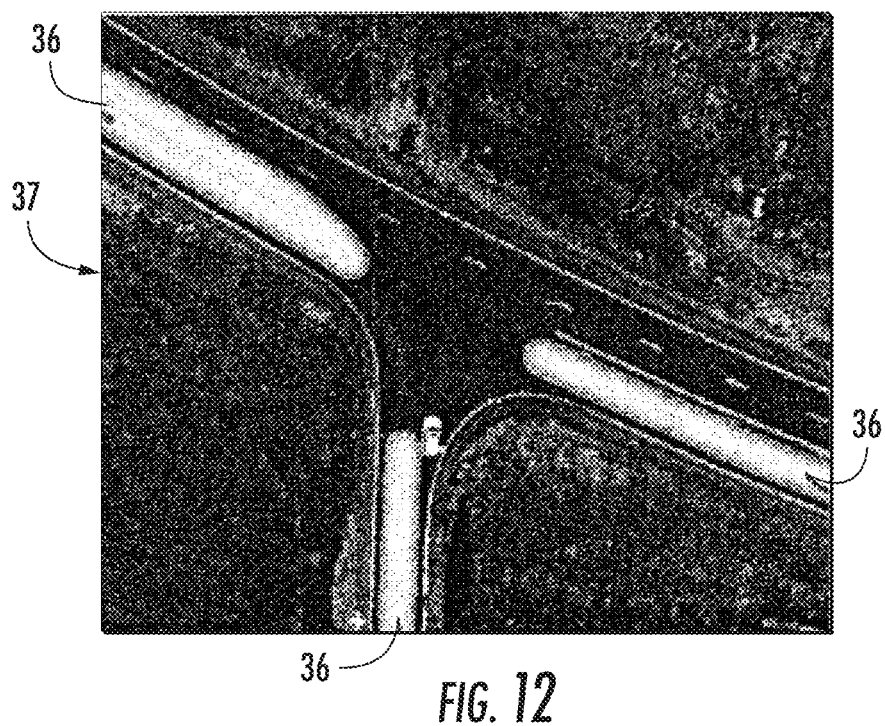
FIG. 12 is an exemplary image illustrating a relatively large blurring of the image of FIG. 11.

Referring to the image 35 in FIG. 11, a blurring of the training mask 36 with a relatively small blur is illustrated. The image 37 in FIG. 12 illustrates a blurring of the same training mask 36 with a relatively large blur. The training model begins training with the relatively large blur (FIG. 12) because it is generally easier to learn a "wider" line. As training progresses, the blurring factor is decreased to nudge the training model to learn the precise location of the lines, for example, in the images.

Fuzzification may be considered stochastic discrete blurring. That is, some deep learning models generally cannot learn continuous values and may be more suited to learning a true binary mask. In that case, most of the value of a blurring transform may be obtained based upon the stochastic nature of the example mask pixels. Fuzzification may be performed in two steps. In the first step, the image is blurred, for example, as described above, but then individual pixels are turned on or off based upon the relative probability of the blurred value. That is, instead of a continuous blurred region at the edge, some pixels will be on and some will be off, with the probability chosen by that continuous blur value. Stochastically, this provides the same result (e.g., to within shot noise) of the blurred mask and can apply to deep learning models that require true binary masks.

Figure 13:
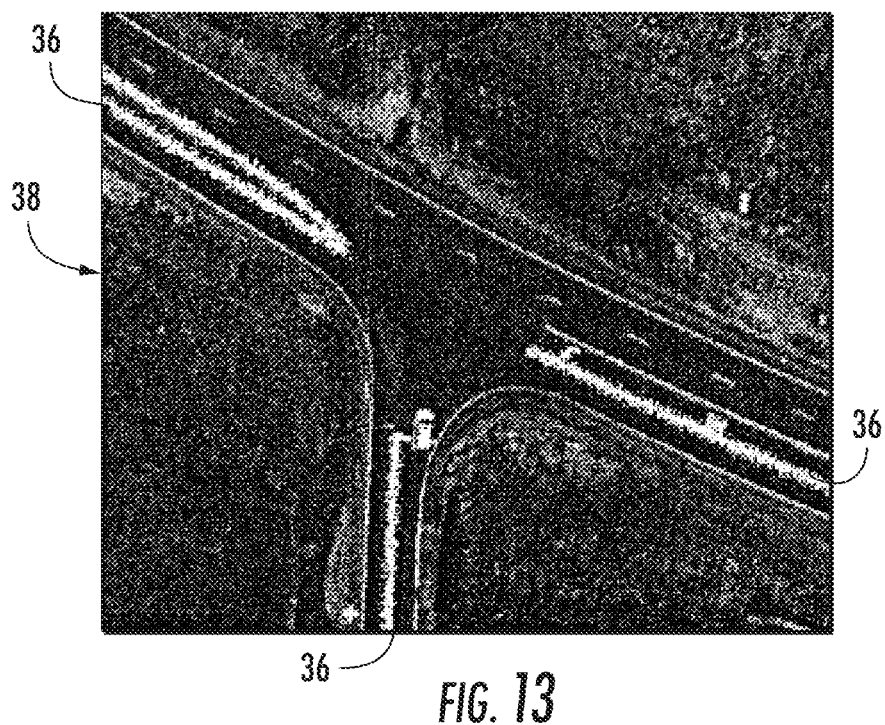
FIG. 13 is a stochastic representation of the blurred image of FIG. 11.
Figure 14:
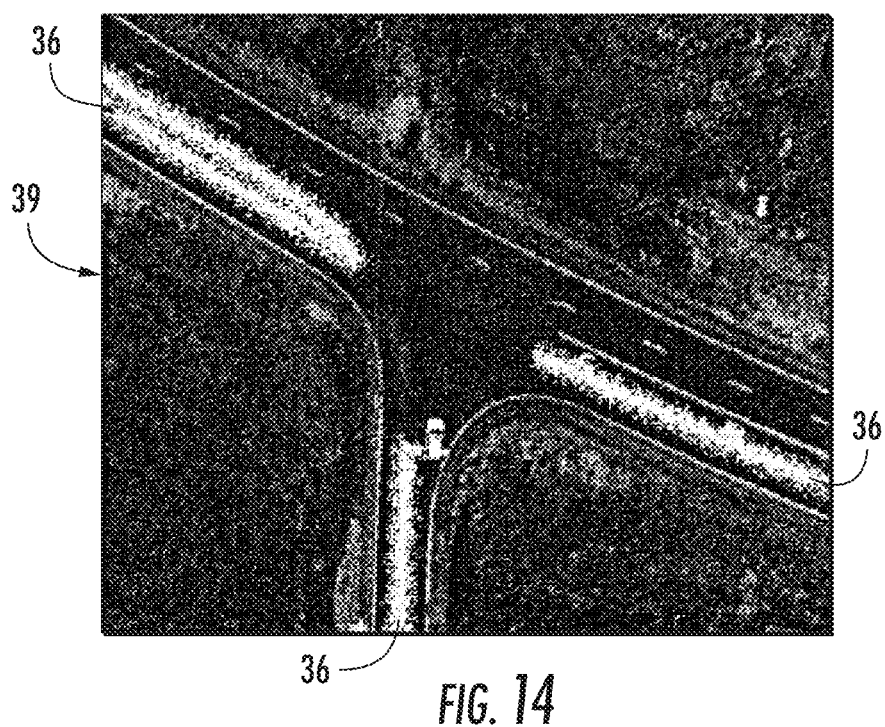
FIG. 14 is a stochastic representation of the blurred image of FIG. 12.

The images 38, 39 in FIGS. 13 and 14 are stochastic representations of the blurred images 35, 37, above. The stochastic representations may be used when a model can only learn binary masks, for example. However, the training behavior is generally the same: start with a large blurring/fuzzing to get the model to catch and then decay to the natural size of the feature.

Both blurring and fuzzification have a single parameter, f, which is the size, or width, of the blurring. For a Gaussian blur, for example, f is standard deviation of the Gaussian function which is convolved with the mask image. Explicitly, $$m_{blur} = Ne\frac{d^2}{f^2}$$

where $m_{blur}$ is the blurred mask pixel, d is the distance of each pixel to the nearest "on" pixel, f is the size of the blur, and N is a normalization constant to make $m_{blur}$ be in the range [0,1] for the Gaussian blur. For Gaussian fuzzification, each masked pixels, $m_{fuzz}$, is chosen to be 1 with a probability of $m_{blur}$.

As with the b parameter described above, f is also adjusted during training (at the end of each epoch, e.g., according to a user specified schedule) and the blurred and fuzzy masks are created on the fly based on a dynamic f. The value of f starts relatively large so as to attract the training model to learn the masked pixels, and f decays such that at the end of training, it represents the physical size of the given feature that the training model is learning. For example, if learning the location of a road, f decays so that at the end of training, f will be the typical width of a road, or if learning the location of trees, f terminates at the typical diameter of a tree canopy.

Like, b, as f approaches 0, it behaves as if no blurring happens. This permits the training models to which the techniques described herein are applied to degenerate and behave like a traditional deep learning model.

A method aspect is directed to a method of processing an image. The method includes using a processor 21 and an associated memory 22 to store training data 41 that includes a plurality of training geospatial images 42*a*-42*n*. The method also includes using the processor 21 to blur each of the plurality of training geospatial images 42*a*-42*n*, and iteratively operate a training model 43 to identify a given feature 44*a*-44*n* from each of the plurality of blurred training geospatial images 48*a*-48*n* so that the blurring is reduced with each iteration.

A computer readable medium aspect is directed to a non-transitory computer readable medium for processing an image. The non-transitory computer readable medium includes computer executable instructions that when executed by a processor 21 cause the processor to perform operations. The operations include storing training data 41 that includes a plurality of training geospatial images 42*a*-42*n*, and blurring each of the plurality of training geospatial images. The operations also include iteratively operating a training model 43 to identify a given feature 44a-44n from each of the plurality of blurred training geospatial images 48a-48n so that the blurring is reduced with each iteration.

Figure 15:
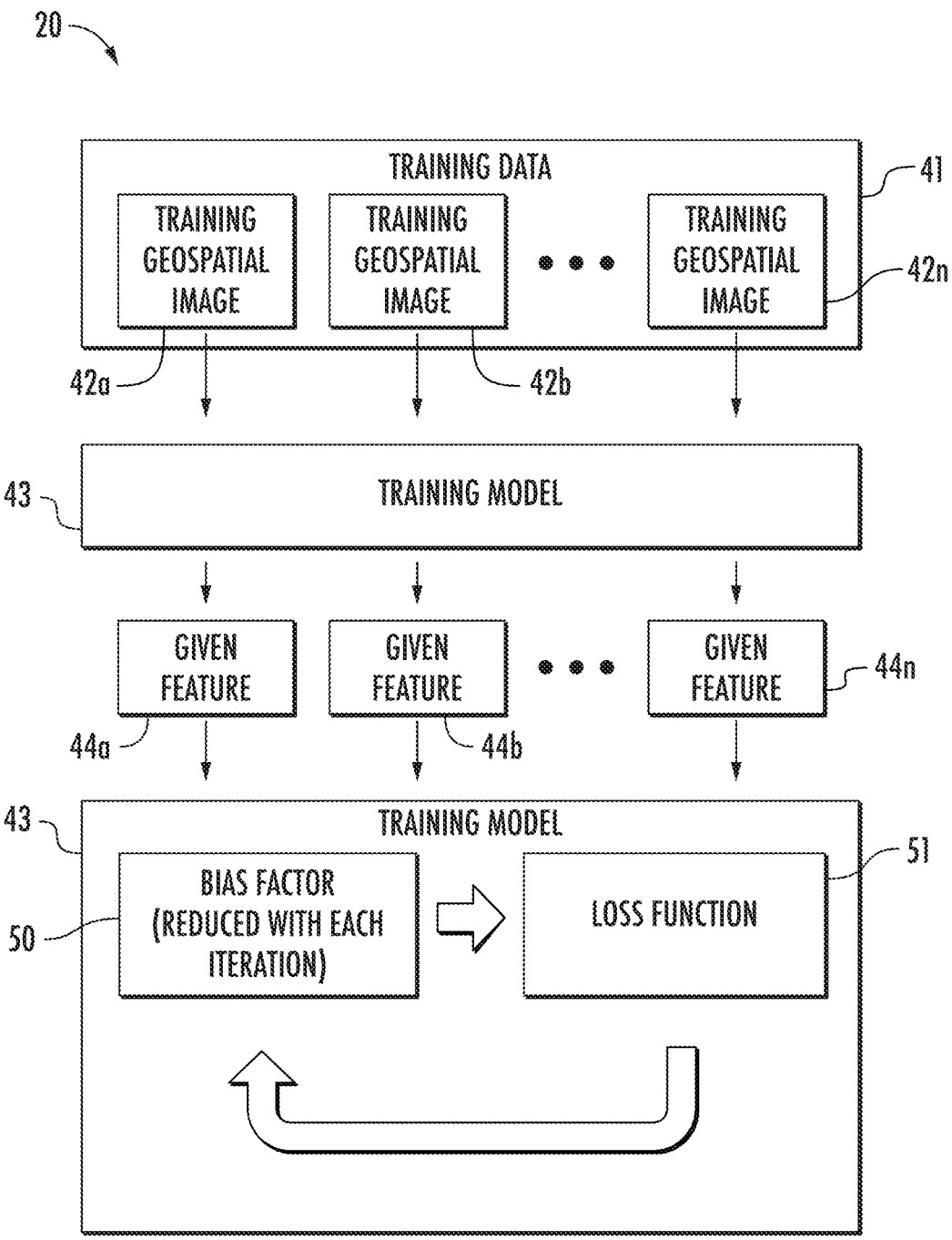
FIG. 15 is a schematic diagram of an image processing system according to an embodiment.
Figure 17:
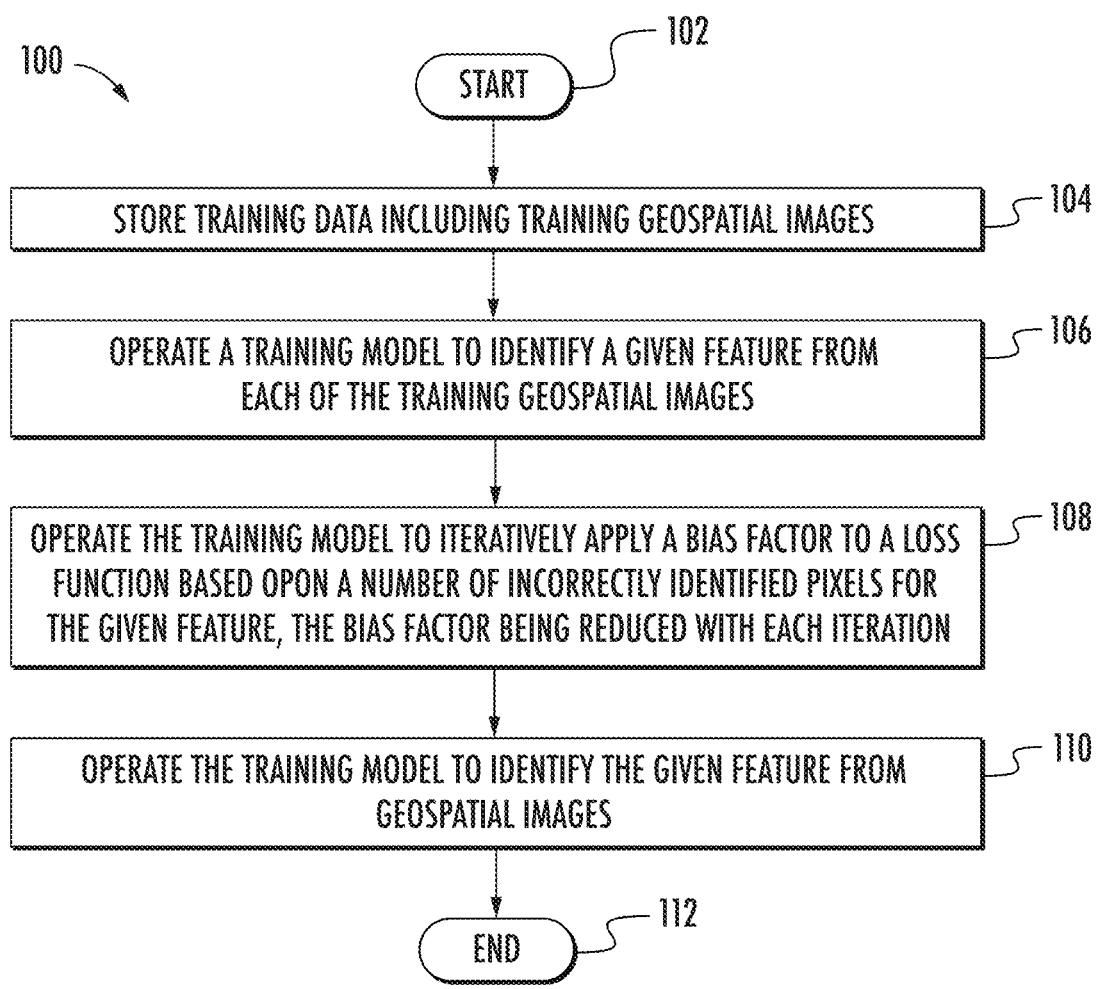
FIG. 17 is a flow diagram illustrating operation of the image processing system of FIG. 15.

Referring now to FIGS. 15 and 16, and the flowchart 100 in FIG. 17, beginning at Block 102, further operations of the image processing system 20 will now be described with respect to loss biasing. At Block 104, the processor 21 stores training data 41 that includes training geospatial images 42a-42n. Each training geospatial image 42a-42n may include pixels. At Block 106, the processor operates a training model 43 to identify a given feature 44a-44n from the each of the training geospatial images 42a-42n. The training model 43 may be a mask-based model, for example.

The processor 21 operates the training model 43 to iteratively apply a bias factor 50 to a loss function 51 based upon a number of incorrectly identified pixels for the given feature 44a-44n with the bias factor being reduced with each iteration (Block 108). The bias factor 50 may be an exponential function based upon the pixels. More particularly, the bias factor 50 may be based upon a product of a summation of the exponential function by the loss function 51. In some embodiments, the processor 21 may iteratively apply the bias factor 50 for masked ones of the pixels.

The processor 21 operates the training model 43 to identify the given feature 44a-44n from geospatial images (Block 110). In other words, upon completion of the training model 43, the model is used to identify the given feature 44a-44n in images that were not used for training. Operations end at Block 112.

Further details of applying a bias factor 50 to a loss function 51 will now be described. When training a model, a single value, the loss value, may be used to signify how well the training model 43 is learning. It may be desirable to adjust the training model 43 to reduce or minimize losses.

If the training model 43 predicts that a pixel is part of a given feature, and it actually is, a desirable contribution loss is 0. Likewise, if the training model 43 predicts a pixel is not part of a given feature 44a-44n, and it actually is not, the desired contribution loss is also 0. That is, there is "no prediction loss." Conversely, if the training model predicts 1, and the true answer is 0, or it predicts 0 and the true answer is 1, it may be desirable to have a positive contribution to the loss.

Those skilled in the art will appreciate that there may be a number of techniques to calculate loss, but these techniques fail when the proportion of negatives is substantially larger than the positives in a training corpus. If negatives greatly outweigh the positives, then the simplest case is for the model to predict everything is negative. Since the training model will be right so much of the time, the loss from getting the positives wrong is negligible.

Accordingly, it may be desirable to include a strong bias to the loss function 51 so that misidentifying positives is much worse than misidentifying negatives. Since there are so many negatives, the sheer number of the negatives will contribute to the loss function sufficiently.

The loss function 51 is thus multiplied by a "loss bias" that is based on the mask value to be learned. Similar to the other transforms described herein, it is generally desirable that the biased loss function 51 to be smooth and to gracefully degenerate to the case of not having an effect.

Accordingly, a new loss function may be defined: $\Sigma_m L'(m) = \Sigma_m e^{lm} \times L(m)$, where $L(m)$ is the original loss function and $e^{lm}$ is the loss bias for all masked pixels, m. This bias transform may work with any loss function, though typically cross-entropy loss is used for categorical mask-based classification. The value for l should thus be chosen so that the loss function is weighted to have a generally equal effect on positive and negative pixels. As the limit of l approaches 0, the weighted value l will have little or no effect on the loss function.

A method aspect is directed to a method of processing an image. The method may include using a processor 21 and an associated memory 22 to store training data 41 that includes a plurality of training geospatial images 42a-42n. The method includes using the processor 21 to operate a training model 43 to identify a given feature 44a-44n from each of the plurality of training geospatial images 42a-42n, and to iteratively apply a bias factor 50 to a loss function 51 based upon a number of incorrectly identified pixels for the given feature. The bias factor 50 may be reduced with each iteration.

A computer readable medium aspect is directed to a non-transitory computer readable medium for processing an image. The non-transitory computer readable medium includes computer executable instructions that when executed by processor 21 cause the processor to perform operations. The operations include storing training data 41 that includes a plurality of training geospatial images 42a-42n. The operations include operating a training model 43 to identify a given feature 44a-44n from each of the plurality of training geospatial images 42a-42n, and to iteratively apply a bias factor 50 to a loss function 51 based upon a number of incorrectly identified pixels for the given feature. The bias factor 50 may be reduced with each iteration.

Those skilled in the art will appreciate that the techniques described herein advantageously provide quicker and more accurate training of a training model with respect to deep learning, particularly in the case of a sparse feature count (i.e., when the number of negative examples greatly outweighs the number of positives). Indeed, each technique described herein has a tunable parameter that typically decays towards 0 during training such that the final trained model has the desired statistical distribution. That is, the tunable parameters assist in providing increased speed and quality of the training, but generally do not have a fundamental effect on the final result.

Additionally, the tunable parameters are applied during (e.g., only during) training. That is, when the training model is considered complete and ready for production classification by the end user, the user may feed their original data to be classified—no further transforms need to be applied to their data before providing it as an input to the model.

Moreover, those skilled in the art will appreciate that the techniques described herein may occur or be performed independently from one another and/or in a sequence. For example, generating the PDF 47 based upon a bias factor 45 may be considered as conceptually determining which examples are shown to a training model 43, while blurring and fuzzification may conceptually be considered a modification to the examples, and while biasing the loss function 51 with a bias factor 50 may conceptually be considered a determination of the accuracy of the training model.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that That which is claimed is:

1. An image processing system comprising:
a processor and an associated memory configured to
store training data comprising a plurality of training geospatial images, each training geospatial image comprising a plurality of pixels, and
operate a training model to identify a given feature from each of the plurality of training geospatial images, and to iteratively generate a probability distribution function based upon a number of pixels corresponding to the given feature and also based upon a bias factor being reduced with each iteration.

2. The image processing system of claim 1 wherein the training model comprises a mask-based training model.

3. The image processing system of claim 1 wherein said processor is configured to reduce the bias factor to a terminal non-zero bias factor.

4. The image processing system of claim 1 wherein said processor is configured to reduce the bias factor to a terminal zero bias factor.

5. The image processing system of claim 1 wherein said processor is configured to use an initial bias factor so that the training model identifies a pixel corresponding to the given feature for each predetermined number of pixels that do not correspond to the given feature.

6. The image processing system of claim 1 wherein said processor is configured to generate the probability distribution function based upon an entropy of each training geospatial image.

7. The image processing system of claim 1 wherein said processor is configured to generate the probability distribution function based upon a Shannon entropy of each training geospatial image.

8. The image processing system of claim 1 wherein said processor is configured to operate the training model to identify the given feature from a plurality of geospatial images.

9. A method of processing an image comprising:
using a processor and an associated memory to
store training data comprising a plurality of training geospatial images, each training geospatial image comprising a plurality of pixels, and
operate a training model to identify a given feature from each of the plurality of training geospatial images, and to iteratively generate a probability distribution function based upon a number of pixels corresponding to the given feature and also based upon a bias factor being reduced with each iteration.

10. The method of claim 9 wherein the training model comprises a mask-based training model.

11. The method of claim 9 wherein using the processor comprises using the processor to reduce the bias factor to a terminal non-zero bias factor.

12. The method of claim 9 wherein using the processor comprises using the processor to reduce the bias factor to a terminal zero bias factor.

13. The method of claim 9 wherein using the processor comprises using the processor to use an initial bias factor so that the training model identifies a pixel corresponding to the given feature for each predetermined number of pixels that do not correspond to the given feature.

14. The method of claim 9 wherein using the processor comprises using the processor to generate the probability distribution function based upon an entropy of each training geospatial image.

15. The method of claim 9 wherein using the processor comprises using the processor to generate the probability distribution function based upon a Shannon entropy of each training geospatial image.

16. The method of claim 9 wherein using the processor comprises using the processor to operate the training model to identify the given feature from a plurality of geospatial images.

17. A non-transitory computer readable medium for processing an image, the non-transitory computer readable medium comprising computer executable instructions that when executed by a processor cause the processor to perform operations comprising:
storing training data comprising a plurality of training geospatial images, each training geospatial image comprising a plurality of pixels; and
operating a training model to identify a given feature from each of the plurality of training geospatial images, and to iteratively generate a probability distribution function based upon a number of pixels corresponding to the given feature and also based upon a bias factor being reduced with each iteration.

18. The non-transitory computer readable medium of claim 17 wherein the training model comprises a mask-based training model.

19. The non-transitory computer readable medium of claim 17 wherein the operations comprise reducing the bias factor to a terminal non-zero bias factor.

20. The non-transitory computer readable medium of claim 17 wherein the operations comprise reducing the bias factor to a terminal zero bias factor.

21. The non-transitory computer readable medium of claim 17 wherein the operations comprise using an initial bias factor so that the training model identifies a pixel corresponding to the given feature for each predetermined number of pixels that do not correspond to the given feature.

22. The non-transitory computer readable medium of claim 17 wherein the operations comprise generating the probability distribution function based upon an entropy of each training geospatial image.

23. The non-transitory computer readable medium of claim 17 wherein the operations comprise generating the probability distribution function based upon a Shannon entropy of each training geospatial image.

24. The non-transitory computer readable medium of claim 17 wherein the operations comprise operating the training model to identify the given feature from a plurality of geospatial images.

* * * * *